(12) United States Patent
Nakashima et al.

(10) Patent No.: US 6,680,773 B2
(45) Date of Patent: Jan. 20, 2004

(54) LIQUID CRYSTAL DISPLAY DEVICE AND METHOD OF MAKING SEMICONDUCTOR CHIPS FOR LIQUID CRYSTAL DISPLAY DEVICE

(75) Inventors: Takayuki Nakashima, Kyoto (JP); Hiroo Mochida, Kyoto (JP); Hideki Hayashi, Kyoto (JP); Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 177 days.

(21) Appl. No.: 09/981,800

(22) Filed: Oct. 19, 2001

(65) Prior Publication Data

US 2002/0072141 A1 Jun. 13, 2002

(30) Foreign Application Priority Data

Oct. 20, 2000 (JP) .......................... 2000-321440
Nov. 1, 2000 (JP) .......................... 2000-334264

(51) Int. Cl.[7] .......................................... G02F 1/1345
(52) U.S. Cl. ...................... 349/151; 349/143; 349/152; 349/158
(58) Field of Search ............................. 349/149, 150, 349/151, 152, 139, 158, 143

(56) References Cited

U.S. PATENT DOCUMENTS 5,689,352 A * 11/1997 Kishigami ............... 349/149
6,388,651 B1 * 5/2002 Kinoshita et al. ............ 345/98

* cited by examiner

Primary Examiner—Toan Ton
Assistant Examiner—Tai Duong
(74) Attorney, Agent, or Firm—Michael D. Bednarek; Shaw Pittman LLP

(57) ABSTRACT

There is provided a liquid crystal display device including a first transparent substrate and a second transparent substrate pasted to each other via a liquid crystal sealing space in between, and provided with a predetermined display region. The first transparent substrate is integrally formed with an extension extending further than an edge of the second transparent substrate and longitudinally of the edge of the second transparent substrate. The extension is provided with at least one semiconductor chip having a longitudinal axis laid longitudinally of the extension. The extension is formed with an external connection terminal region including a plurality of terminals. The external connection terminal region does not overlap the semiconductor chip longitudinally of the extension.

6 Claims, 6 Drawing Sheets

LIQUID CRYSTAL DISPLAY DEVICE AND METHOD OF MAKING SEMICONDUCTOR CHIPS FOR LIQUID CRYSTAL DISPLAY DEVICE

BACKGROUND OF THE INVENTION

1. Field of the Invention

The present invention relates to a liquid crystal display device including two transparent substrates pasted to each other via a liquid crystal sealing space in between, with a semiconductor chip mounted directly on one of the transparent substrates. The present invention also provides a method of making semiconductor chips used in such a liquid crystal display device.

2. Description of Related Art

In some liquid crystal display devices, overall size reduction and weight reduction including miniaturization of the control and driving circuits is important. In such a liquid crystal display device, a semiconductor chip that provides the control and driving circuits is mounted directly on one of the two transparent substrates included in the liquid crystal display device.

As shown in FIG. 8, according to this kind of liquid crystal display device 10, the two transparent substrates 11, 12 are pasted together, via a predetermined liquid crystal sealing space in between, to provide a display region S, and one transparent substrate 11 of the two is formed with an extension 13 extending further than an edge 12a of the other transparent substrate 12. On the extension 13, a semiconductor chip 20 is mounted directly, and further, external connection terminals 30 including a plurality of terminals are disposed. The external connection terminals 30 are connected with a cable such as a flexible flat cable 60, thereby providing the liquid crystal display device 10 with electrical connection with e.g. an external control circuit.

As understood from FIG. 8, the liquid crystal display device 10 according to this arrangement has its extension 13 formed oblong like a belt, and the semiconductor chip 20, which is oblong and rectangular, is disposed with its longitudinal axis laid longitudinally of the extension 13. Further, the external connection terminals 30 are disposed more outwardly than the semiconductor chip 20 and along an outer edge 13a of the extension 13.

In such an arrangement, each of the external connection terminals 30 must have a reliable connection with the flexible flat cable 60, mechanically as well as electrically, using solder for example. For this reason, each terminal must be given a certain minimum dimension widthwise of the extension 13. Thus, the extension 13 requires an extended dimension L which is at least a sum of the above-mentioned dimension of the terminal, the width of the semiconductor chip 20 and a certain margin necessary for formation of a wiring pattern. This has been a reason why the liquid crystal display device 10 cannot be further miniaturized or light-weighted.

SUMMARY OF THE INVENTION

It is therefore a primary object of the present invention to provide a liquid crystal display device capable of facilitating further reduction in the and weight.

Another object of the present invention is to provide a method of making semiconductor chips suitably used in such a liquid crystal display device.

A liquid crystal display device provided by a first aspect of the present invention is a liquid crystal display device including a first transparent substrate and a second transparent substrate pasted to each other via a liquid crystal sealing space in between, and provided with a predetermined display region, wherein the first transparent substrate is integrally formed with an extension extending further than an edge of the second transparent substrate and longitudinally of the edge of the second transparent substrate, wherein the extension is provided with at least one semiconductor chip having a longitudinal axis laid longitudinally of the extension, and wherein the extension is formed with an external connection terminal region including a plurality of terminals, the external connection terminal region not overlapping the semiconductor chip longitudinally.

According to a preferred embodiment, the semiconductor chip includes a plurality of semiconductor chips.

Also, according to the preferred embodiment, the semiconductor chips are spaced from each other longitudinally of the extension, and the external connection terminal region is between the semiconductor chips.

Further, according to the preferred embodiment, the semiconductor chip includes a first semiconductor chip incorporating a driver analog circuit and a second semiconductor chip incorporating a control circuit and/or a logic circuit which includes a storage circuit and so on.

According to another preferred embodiment, the display region is divided into a first display portion and a second display portion. The semiconductor chip includes a first semiconductor chip serving the first display portion and a second semiconductor chip serving the second display portion.

According to another preferred embodiment, a circuit pattern formed in the first semiconductor chip and a circuit pattern formed in the second semiconductor chip are symmetric to each other.

According to any of the liquid crystal display devices having one of the arrangements described above, the semiconductor chip(s) and the external connection terminal region do not overlap each other longitudinally of the extension. Therefore, it becomes possible to save the width of the extension, and as a result, further size reduction and weight reduction of the liquid crystal display device can be promoted.

A second aspect of the present invention provides a method of making a first semiconductor chip and a second semiconductor chip for a liquid crystal display device having a display region divided into a first display portion and a second display portion, the first semiconductor chip serving the first display portion, the second semiconductor chip serving the second display portion, the method comprising wafer processes using a plurality of masks in making the first semiconductor chip and the second semiconductor chip, a mask for use in a wafer process for the first semiconductor chip being turned over to be a mask for use in a wafer process for the second semiconductor chip.

Other characteristics and advantages of the present invention will become clearer from the following description of embodiments to be presented with reference to the accompanying drawings.

DESCRIPTION OF PREFERRED EMBODIMENTS

Hereinafter, preferred embodiments of the present invention will be described specifically, with reference to FIG. 1 to FIG. 7. It should be noted here that throughout these drawings, members and portions equivalent to those in the convention shown in FIG. 8 are given the same reference codes.

Figure 1:
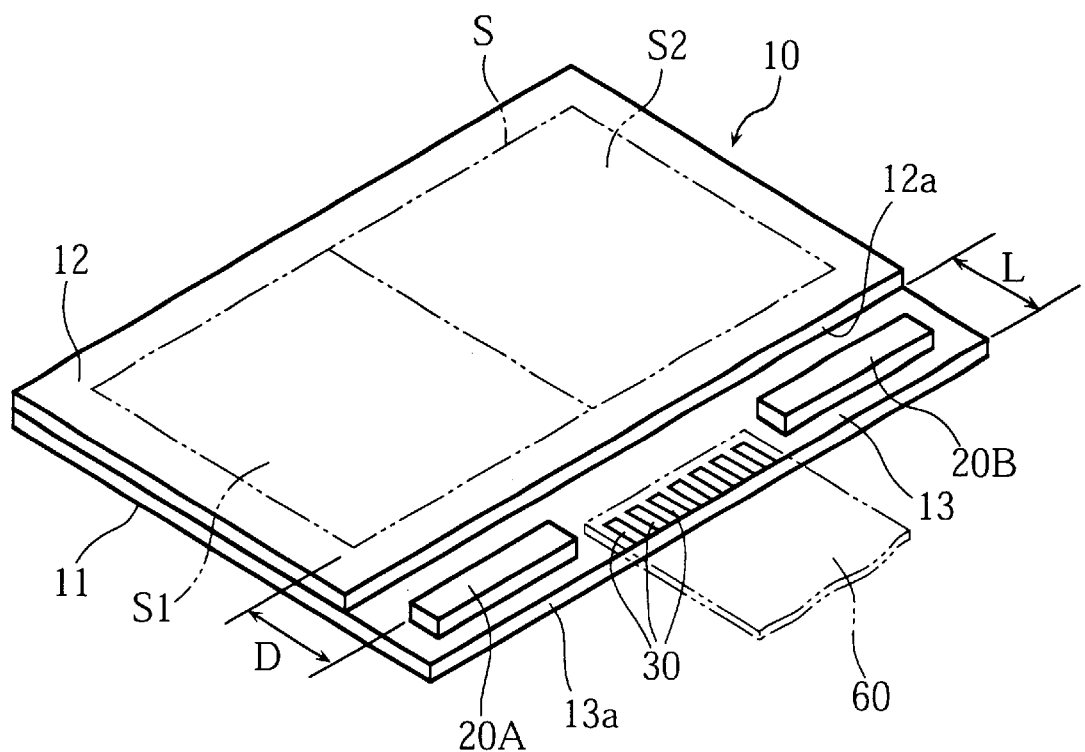
FIG. 1 is an overall perspective view showing an outline arrangement of a liquid crystal display device according to a first embodiment of the present invention.
Figure 2:
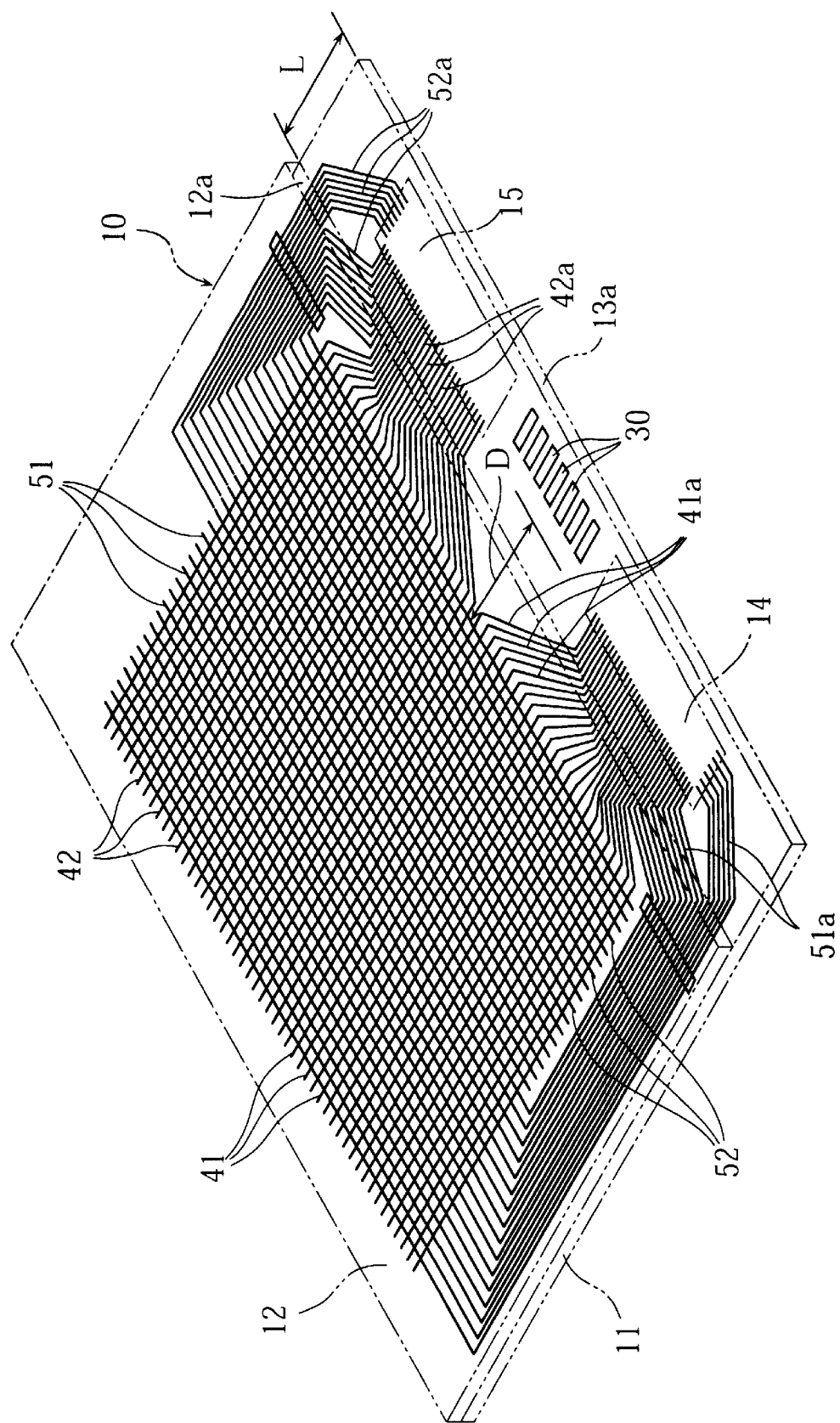
FIG. 2 is an overall perspective view showing a detail of the liquid crystal display device in FIG. 1.
Figure 3:
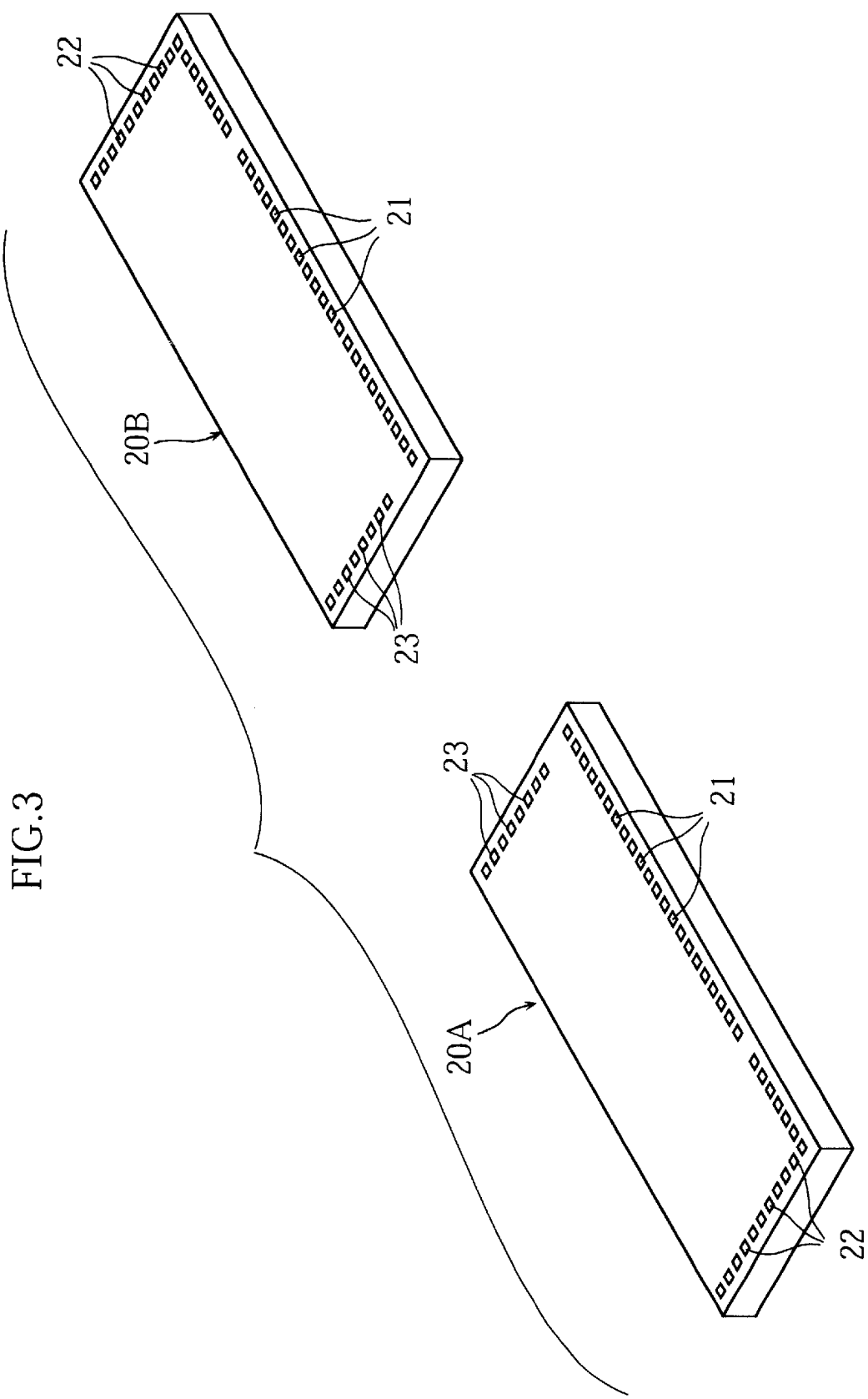
FIG. 3 is a perspective view showing pad layout in a first semiconductor chip and in a second semiconductor chip used in the liquid crystal display device presented in FIG. 1 and FIG. 2.

FIG. 1 through FIG. 3 show a first embodiment of a liquid crystal display device 10 according to the present invention. As shown in FIG. 1 and FIG. 2, the liquid crystal display device 10 includes a first transparent substrate 11 and a second transparent substrate 12. The first transparent substrate 11 and the second transparent substrate 12 are each rectangular in a plan view, and are pasted to each other, sandwiching a liquid crystal sealing space formed in between. The first transparent substrate 11 is integrally formed with an extension 13 extending outwardly by a dimension L beyond an edge 12a of the second transparent substrate 12. The extension 13 is oblong rectangular along the edge 12a of the second transparent substrate 12.

Semiconductor chips 20A, 20B which incorporate predetermined circuitry for controlling and driving the liquid crystal display device 10 are mounted directly on the extension 13. The semiconductor chips have their respective main surfaces faced down, and the mounting is made directly via e.g. anisotropic electric conductor. Further, external connection terminals 30 including a plurality of terminals are disposed along an outer edge 13a of the extension 13.

The semiconductor chips 20A, 20B are disposed so that their respective longitudinal axis run longitudinally of the extension 13. Further, according to the present invention, these semiconductor chips 20A, 20B are disposed so as not overlap with the external connection terminals 30 longitudinally of extension 13.

According to the first embodiment, the display region S is divided into two portions, i.e. a first display portion S1 which is the left half, and a second display portion S2 which is the right half. With this construction, two semiconductor chips are used. Specifically, the first display portion S1 is controlled and driven by the first semiconductor chip 20A, and the second display portion S2 is controlled and driven by the second semiconductor chip 20B. The first semiconductor chip 20A and the second semiconductor chip 20B are spaced from each other by a predetermined distance on the extension 13, and the external connection terminals 30 are provided between the first semiconductor chip 20A and the second semiconductor chip 20B. This arrangement will be described more specifically.

On an inner surface of the first transparent substrate 11, a plurality of segment electrodes 41, 42 made of an electrically conductive transparent material such as ITO are formed to extend in a vertical direction. The segment electrodes are grouped into two, i.e. one for the first display portion and the other for the second display portion. The segment electrodes 41, which is for the first display portion, has segment wiring patterns 41a gathering at a mounting position 14 of the first semiconductor chip 20A on the extension 13. The segment electrodes 42, which is for the second display portion, has segment wiring patterns 42a gathering at a mounting position 15 of the second semiconductor chip 20B on the extension 13.

On an inner surface of the second transparent substrate 12, a plurality of common electrodes 51, 52 made of an electrically conductive transparent material are formed to extend in a lateral direction, perpendicularly to the segment electrodes 41, 42. The common electrodes are grouped into two, i.e. a first group 51 for an upper portion of the display region S, and a second group 52 for a lower portion thereof. The first group 51 has common wiring patterns 51a which run through the left portion of the display region S, go on to the first transparent substrate 11, and then gather at the mounting position 14 of the first semiconductor chip 20A on the extension 13. The second group 52 has common wiring patterns 52a which run through the right portion of the display region S, go on to the first transparent substrate 11, and then gather at the mounting position 15 of the second semiconductor chip 20B on the extension 13.

Each of the first semiconductor chip 20A and the second semiconductor chip 20B has, as shown in FIG. 3, a main surface formed with a predetermined circuit pattern (not illustrated) and electrode pads 21, 22, 23 along circumferential edges. The layout of these electrode pads 21, 22, 23 facilitates appropriate connection with each of the segment wiring patterns 41a, 42a, and common wiring patterns 51a, 52a. Specifically, in FIG. 3, the electrode pads 21 are those for the segments, and the electrode pads 22 are those for the commons. The layout pattern of these electrode pads 21, 22 in the first semiconductor chip 20A and that in the second semiconductor chip 20B are symmetrical to each other. The electrode pads 23 in FIG. 3 are for supply of power as well as controlling and signaling inputs. These input pads are connected to the external connection terminals 30 formed between the two semiconductor chips 20A, 20B on the extension 13, via unillustrated wiring patterns formed on the extension 13. The external connection terminals 30 are soldered to a flexible flat cable 60 for example, whereby the liquid crystal display device 10 is connected to an external controlling circuit.

The wiring patterns 41a, 42a, 51a, 52a, the external connection terminals 30, and the wiring patterns for connecting the external connection terminals 30 with the semiconductor chips 20A, 20B can be formed simultaneously on the extension 13, when the segment electrodes 41, 42 are formed on the inner surface of the first transparent substrate 11 by means of a photo-litho process.

With the above-described arrangement, on the extension 13, the semiconductor chips 20A, 20B are disposed so as not to overlap with the external connection terminals 30 longitudinally of extensions 13. Thus, as clearly shown in FIG. 2, it becomes possible to dispose the semiconductor chips 20A, 20B and the external connection terminals 30 in a row, longitudinally of the extension 13. This enables to save the extended dimension L of the extension 13, and as a result, size reduction and weight reduction of the liquid crystal display device 10 can be further promoted.

Also, according to the first embodiment, two semiconductor chips are used, i.e. the first semiconductor chip 20A serves the left half of the display region, and the second semiconductor chip 20B serves the right half. This enables to reduce the width of the semiconductors themselves, contributing further to the reduction of the extended dimension L of the extension 13. In addition, density in the segment wiring patterns 41*a*, 42*a* for connection to the semiconductor chips 20A, 20B respectively can now be decreased, which means that a dimension D, i.e. a distance from the semiconductor chips 20A, 20B to the display region S, can be reduced. This also enables to save the extended dimension L of the extension 13, making possible to further promote the size reduction and weight reduction of the liquid crystal display device 10.

Now that it has become possible to reduce the size of the liquid crystal display device 10, particularly of the extension 13 on which the semiconductor chips 20A, 20B are mounted, this offers an advantage in the following case for example. Specifically, in a portable telephone in which a microphone and various button switches are disposed to sandwich the liquid crystal display, the microphone or the button switches can be disposed more closely to the liquid crystal display. This contributes greatly to further size reduction of the portable phone.

As described earlier, the circuit pattern formed on the main surface of the first semiconductor chip 20A and that of the second semiconductor chip 20B according to the first embodiment are mirror symmetric to each other. Such semiconductor chips 20A, 20B can be made efficiently through a method to be described here below.

Specifically, when making this kind of semiconductor chips, a wafer is divided into a matrix of plural regions. These regions are then simultaneously formed with respective circuit patterns, electrodes and so on, and then, a dicing process cuts the wafer into each individual unit semiconductor chip. In such a wafer process, the circuit pattern formation for each region is achieved by means of so called mask work, i.e. a photosensitive process that uses a mask.

Figure 5:
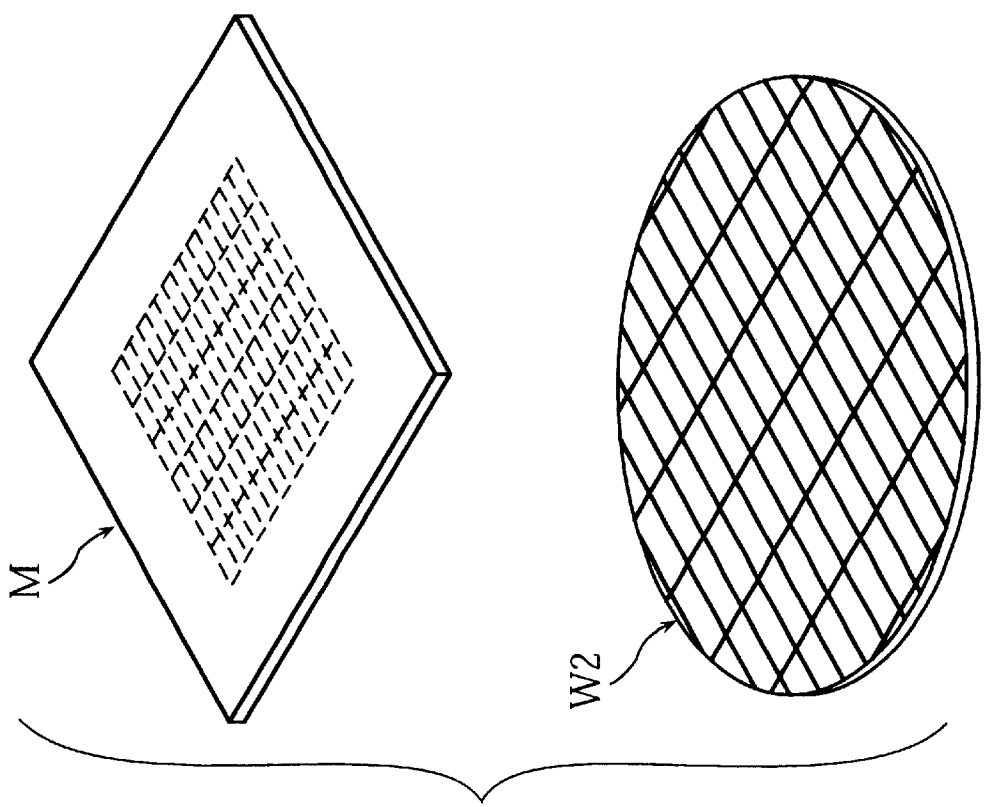
FIG. 5 is a perspective view showing part of a making process of the second semiconductor chip.
Figure 4:
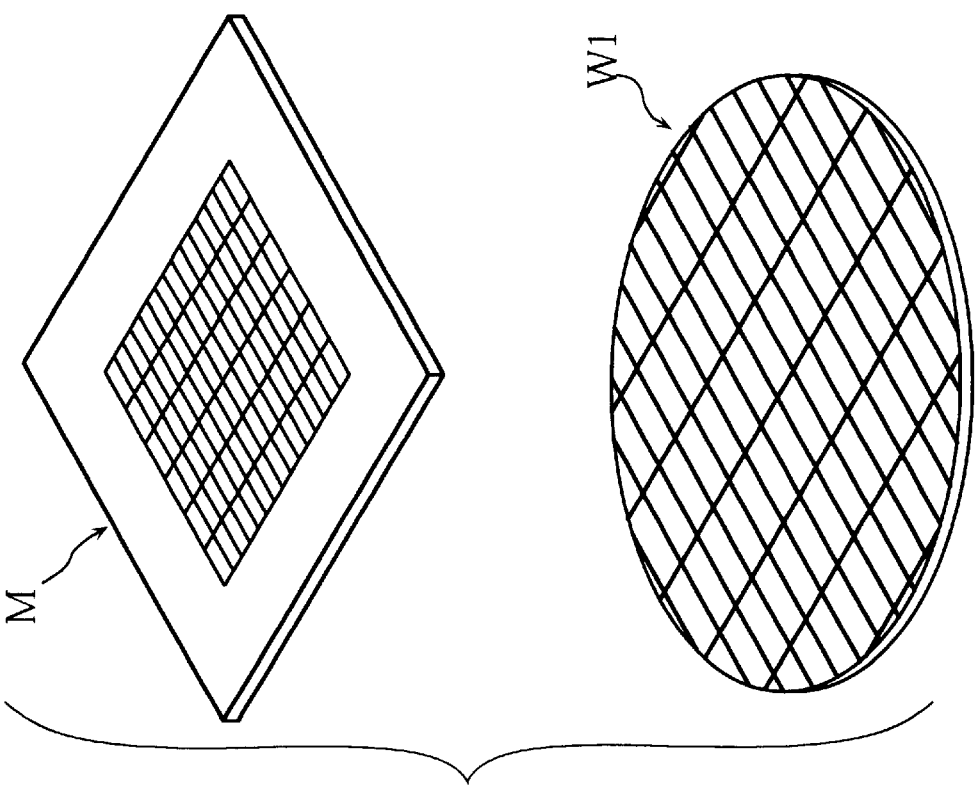
FIG. 4 is a perspective view showing part of a making process of the first semiconductor chip.

As has been described earlier, the circuit pattern formed on the main surface of the first semiconductor chip 20A and that of the second semiconductor chip 20B according to the first embodiment are symmetric to each other. Therefore, even if the circuit patterns are different from each other, these two patterns can be made with a same mask M, and through the following method. Specifically, as shown in FIG. 4, the mask M is first used with its top surface facing upward, to be placed on a wafer WI to perform a mask work for the first semiconductor chip. Then, as shown in FIG. 5, the mask M is turned over to make its top surface facing downward, to be placed on a wafer W2 to perform a mask work for the second semiconductor chip. Thus, necessary mask works can be performed for the formation of circuit patterns and electrodes on each of the regions in the wafers W1, W2. Then, by cutting the wafers into each individual region through the dicing process, the first semiconductor chip 20A and the second semiconductor chip 20B can be made efficiently.

It should be appreciated that turning the mask M includes, in its scope of meaning, making of a new mask by reversing mask data.

Figure 6:
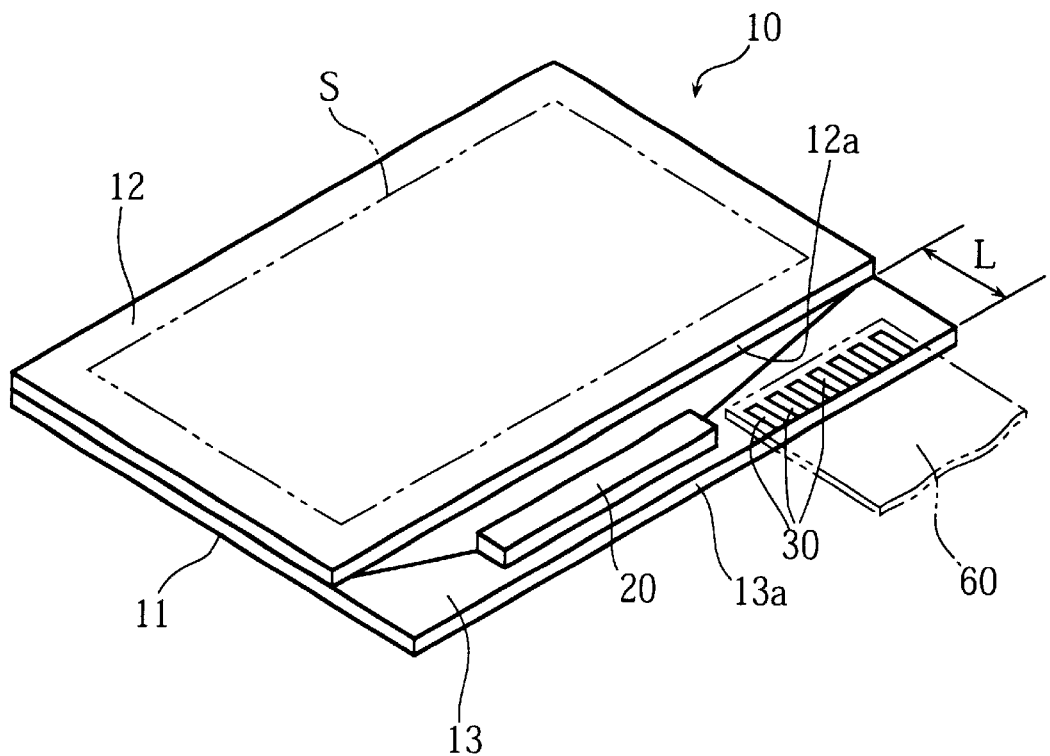
FIG. 6 is an overall perspective view showing an outline arrangement of a liquid crystal display device according to a second embodiment of the present invention.

FIG. 6 shows a second embodiment of the liquid crystal display device according to the present invention. This embodiment is the same as the first embodiment in that a liquid crystal display device 10 includes a first transparent substrate 11 and a second transparent substrate 12 each rectangular in a plan view, that these substrates are pasted to each other via a liquid crystal sealing space, and that the first transparent substrate 11 is formed with an extension 13 extending outwardly beyond an edge 12*a* of the second transparent substrate 12.

According to the second embodiment, there is only one semiconductor chip 20 to be mounted on the extension 13. Therefore, in this case, the semiconductor 20 controls and drives the entire display region S. With this arrangement, the external connection terminal 30, which are disposed along the circumferential edges of the extension 13 and are to be connected to the flexible flat cable 60 and so on, are disposed in the same way as in the first embodiment, i.e., so as not to overlap the semiconductor chip 20 longitudinally of the extension 13. With this arrangement again, it becomes possible to dispose the semiconductor chip 20 and the external connection terminals 30 in a row, longitudinally of the extension 13, enabling to save the extended dimension L of the extension 13, and thereby enabling to promote size reduction and weight reduction of the liquid crystal display device 10.

Figure 7:
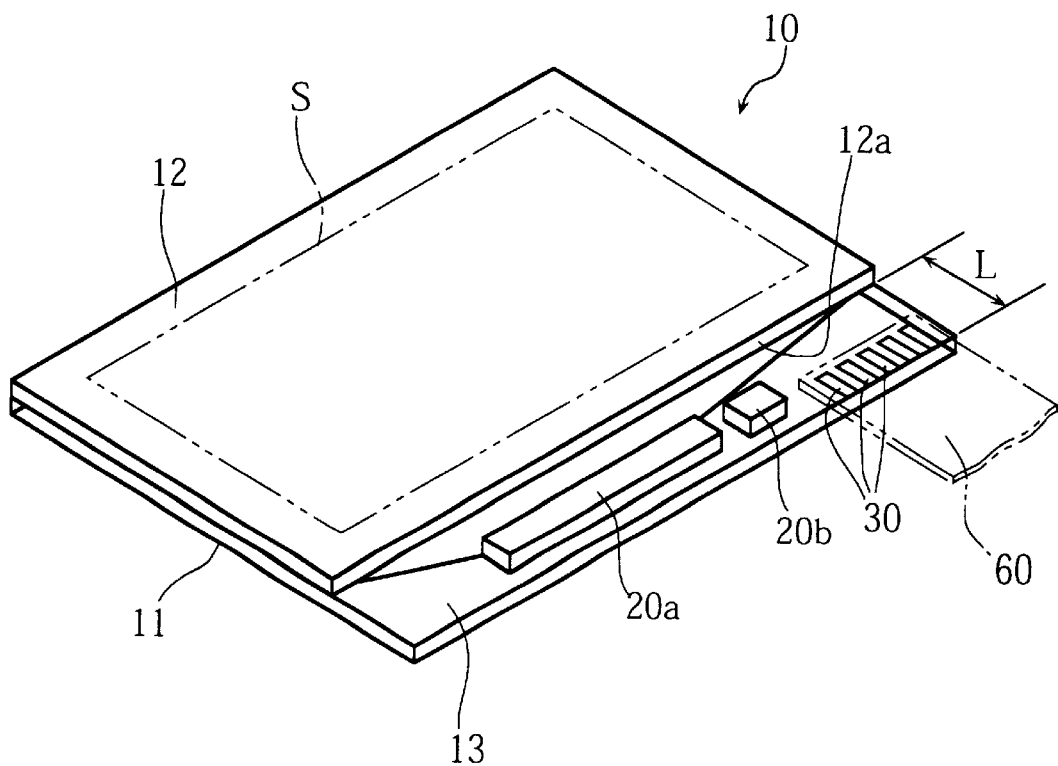
FIG. 7 is an overall perspective view showing an outline arrangement of a liquid crystal display device according to a third embodiment of the present invention.
Figure 8:
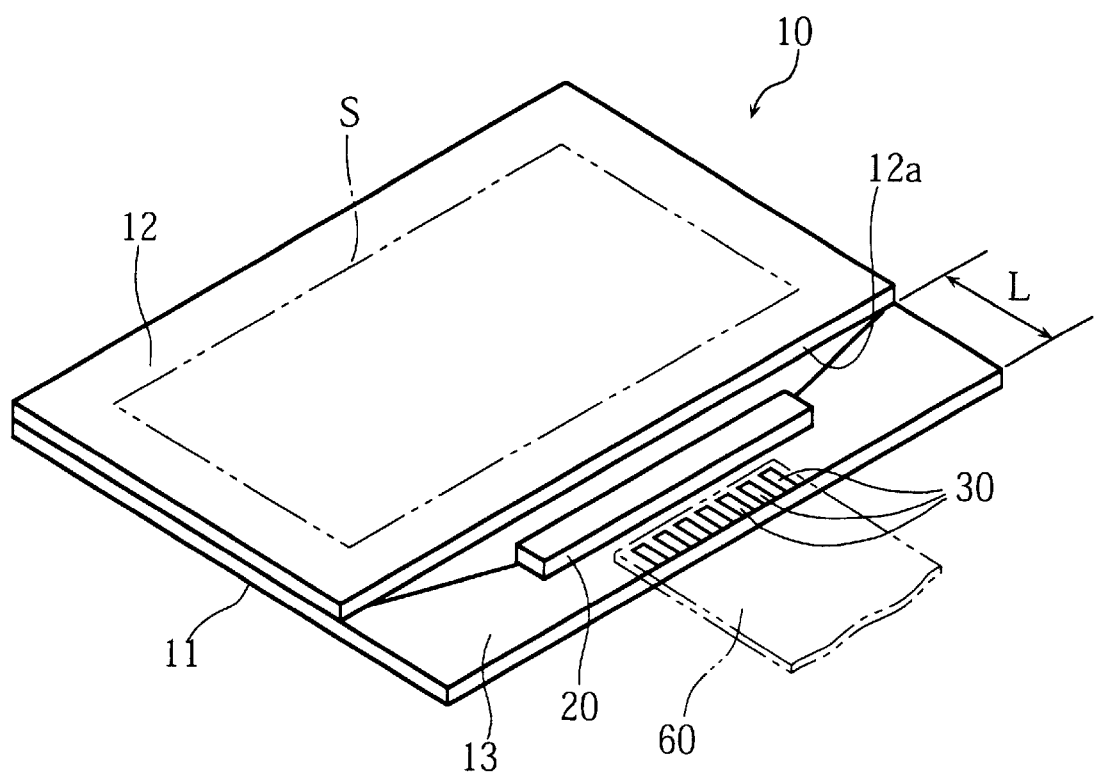
FIG. 8 is an overall perspective view showing a convention.

FIG. 7 shows a third embodiment of the liquid crystal display device according to the present invention.

This embodiment differs from the second embodiment in that the semiconductor chip 20 is divided into a first semiconductor chip 20*a* which is formed only with a driver analog circuit, and a second semiconductor chip 20*b* which is formed only with a logic circuit that controls the first semiconductor chip 20*a*. Otherwise, all the other aspects are the same as the second embodiment. In this arrangement again, the external connection terminals 30 to be connected to the flexible flat cable 60 and so on are disposed so as not to overlap the semiconductor chips 20*a*, 20*b*, in the widthwise direction of the extension 13. Thus, it becomes possible to dispose the semiconductor chips 20*a*, 20*b* and the external connection terminals 30 in a row, longitudinally of the extension 13, enabling to save the extended dimension L of the extension 13, and thereby enabling to promote size reduction and weight reduction of the liquid crystal display device 10.

According to the third embodiment, there is an advantage that the first semiconductor chip 20*a*, which should have the output pads for the segments and/or the commons formed at a required pitch, can be made at a low circuit fineness. Another advantage is that the second semiconductor chip 20*b*, which may not be formed with the output pads for the segments and/or the commons, can be made at a high circuit fineness. Further, the first semiconductor chip 20*a* can be small, to the extent that it does not include the logic circuit, and likewise the second semiconductor chip 20*b* can be small, to the extent that it is not formed with the output pads for the segments and/or the commons. These allow efficient making of the semiconductor chips 20*a*, 20*b* from wafers. In addition, because of the small size, the semiconductor chips 20*a*, 20*b* do not occupy a large area on the extension 13, and in particular the size of the width can be reduced, which leads to further reduction of the extended dimension L of the extension 13.

Obviously, the present invention is not limited to the embodiments thus far described above, and any variation within the scope of each claim is included in the scope of the present invention.

What is claimed is:

1. A liquid crystal display device including a first transparent substrate and a second transparent substrate attached to each other via a liquid crystal sealing space in between, and provided with a predetermined display region, wherein the first transparent substrate has a non-separate excess portion extending beyond only one edge of the second transparent substrate, the excess portion being elongate along said one edge of the second transparent substrate, wherein the excess portion is provided with a plurality of semiconductor chips each having a longitudinal axis extending longitudinally of the extension, and wherein the excess portion is formed with an external connection terminal region including a plurality of terminals, the external connection terminal region not overlapping the semiconductor chips longitudinally of the extension.

2. The liquid crystal display device according to claim 1, wherein the semiconductor chips are spaced from each other longitudinally of the excess portion, the external connection terminal region being disposed between the semiconductor chips.

3. The liquid crystal display device according to claim 1, wherein the semiconductor chips include a first semiconductor chip incorporating a driver analog circuit and a second semiconductor chip incorporating a control circuit and/or a logic circuit which includes a storage circuit.

4. The liquid crystal display device according to claim 1, wherein the display region is divided into a first display portion and a second display portion, one of the semiconductor chips serving the first display portion, another of the semiconductor chips serving the second display portion.

5. A liquid crystal display device comprising:

a first transparent substrate, a second transparent substrate attached to the first transparent substrate with a liquid crystal sealing space formed in between, the second transparent substrate providing a predetermined display region, a plurality of first parallel electrodes formed between the first transparent substrate and the second transparent substrate, the first electrodes extending in a first direction and divided into two groups, a plurality of second parallel electrodes formed between the first transparent substrate and the second transparent substrate, the second electrodes extending in a second direction transverse to the first direction and divided into two groups, a first semiconductor chip mounted on the first transparent substrate, a second semiconductor chip also mounted on the first transparent substrate, and a plurality of external connection terminals formed on the first transparent substrate, wherein the first transparent substrate has an integral excess portion extending beyond an edge of the second transparent substrate, the excess portion being elongate along said edge of the second transparent substrate, wherein the first semiconductor chip, the second semiconductor chip and the external connection terminals being provided on the excess portion with the external connection terminals located between the first semiconductor chip and the second semiconductor chip, and wherein one divided group of first parallel electrodes and one divided group of second parallel electrodes are electrically connected to the first semiconductor chip while the other divided group of first parallel electrodes and the other divided group of second parallel electrodes are electrically connected to the second semiconductor chip.

6. A liquid crystal display device comprising:

a first transparent substrates, a second transparent substrate attached to the first transparent substrate with a liquid crystal sealing space formed in between, the second transparent substrate providing a predetermined display region, a matrix of electrodes formed between the first transparent substrate and the second transparent substrate, a first semiconductor chip mounted on the first transparent substrate, a second semiconductor chip also mounted on the first transparent substrate, a plurality of external connection terminals formed on the first transparent substrate, and means for electrically connecting the matrix electrodes to the first semiconductor chip and the second semiconductor chip, wherein the first transparent substrate has an integral excess portion extending beyond an edge of the second transparent substrate, the excess portion being elongate along said edge of the second transparent substrate, wherein the first semiconductor chip, the second semiconductor chip and the external connection terminals being provided on the excess portion with the external connection terminals located between the first semiconductor chip and the second semiconductor chip, and wherein the means for electrically connecting comprises a first wiring pattern for electrically connecting part of the matrix electrodes to the first semiconductor chip, and a second wiring pattern for electrically connecting the remaining part of the matrix electrodes to the second semiconductor chip, the first wiring pattern and the second wiring pattern being symmetric to each other on the excess portion.

* * * * *